United States Patent [19]

Spielholz

[11] Patent Number: 4,743,430

[45] Date of Patent: May 10, 1988

[54] I C ENGINE POWERED PORTABLE FOAM GENERATOR

[75] Inventor: Bruce A. Spielholz, Smyrna, Ga.

[73] Assignee: Bio-Tek Industries, Inc., Atlanta, Ga.

[21] Appl. No.: 768,877

[22] Filed: Aug. 23, 1985

[51] Int. Cl.[4] .............................................. B29D 27/00

[52] U.S. Cl. ............................ 422/133; 261/DIG. 76; 417/364; 422/131

[58] Field of Search ................................ 422/133, 131; 261/DIG. 26; 417/364

[56] References Cited

U.S. PATENT DOCUMENTS

| | | | |
|---|---|---|---|
| 2,685,404 | 8/1954 | Wohlmeyer | 417/364 |
| 3,046,899 | 7/1962 | Biefang | 417/364 |
| 3,337,195 | 8/1967 | Farison | 261/DIG. 26 |
| 4,316,875 | 2/1982 | Barth et al. | 422/133 |
| 4,391,568 | 7/1983 | Tenney | 417/364 |

*Primary Examiner*—Barry S. Richman
*Assistant Examiner*—William R. Johnson
*Attorney, Agent, or Firm*—Fleit, Jacobson, Cohn & Price

[57] ABSTRACT

A portable foam generator is provided for admixing air under pressure with a foamable liquid under pressure in order to foam the liquid and the foamed liquid is supplied to a spray nozzle for spray applying the foamed liquid to differently oriented surfaces which are to be cleaned and/or disinfected. The foam generator incorporates a feature which enables the "wetness" of the foam discharged from the nozzle to be varied and to thereby enable the foamed liquid applied to downwardly facing surfaces, inclined surfaces and vertical surfaces to experience extended liquid to surface to contact time.

9 Claims, 2 Drawing Sheets

I C ENGINE POWERED PORTABLE FOAM GENERATOR

BACKGROUND OF THE INVENTION

1. Field of the Invention

This invention relates to a sprayer for liquids formulated to foam when mixed with air under pressure and wherein air under pressure is supplied at substantially constant volume and pressure and the liquid is controllably admitted into compressed air discharge line.

The sprayer is constructed to be portable and is powered by a reciprocating piston internal combustion engine which drives an attendant air compresser as well as a liquid pump.

2. Description of Related Art

Various different forms of portable sprayers and non-portable foam generating devices heretofore have been provided such as those disclosed in U.S. Pat. Nos. 2,520,559, 2,668,082, 2,685,404, 3,046,899, 3,586,238, 4,173,951, 4,291,769, 4,391,568, 4,436,489 and 4,457,375.

However, these various different forms of sprayers and foam generators do not include the combination of structural features incorporated in the instant invention which particularly well adapt the latter to be used in the manner intended.

SUMMARY OF THE INVENTION

The foam generator of the instant invention incorporates a motor driving an air compressor and a liquid pump. A suction line opens into the inlet of the pump for supplying liquid to be foamed to the pump, a discharge line extends from the outlet of the air compressor and a liquid pressure supply line extends from the pump outlet to the compressor discharge line. In addition, a liquid dry-out by-pass line has its opposite ends communicated with the suction line and the liquid supply line and includes an inline priming and control valve.

The main object of this invention is to provide an apparatus by which a foamable liquid may be sprayed in a foam state upon surfaces to be cleaned and/or disinfected.

With horizontally upwardly facing surfaces to be cleaned or disinfected, the need for a foamed cleaning and disinfecting liquid is not great. However, when inclined or downwardly facing surfaces are to be cleaned and disinfected little can be done to provide extended contact time for cleaning and disinfecting purposes inasmuch cleaning and disinfecting liquids will rapidly drip from and run down downwardly facing and inclined surfaces.

Accordingly, a need exists for an apparatus by which a foamable cleaning and/or disinfecting liquid may be foamed and sprayed upon down-facing and inclined surfaces to be cleaned and/or disinfected. Such foamed liquid will remain on downwardly facing and inclined surface for extended periods of time and thereby enable greater contact time for the cleaning and/or disinfecting liquid with the surfaces to be cleaned and/or disinfected.

Another object of this invention is to provide an apparatus in accordance with the preceding objects wherein the foamed liquid produced thereby may be varied as to its wetness and thereby tailored according to the type of surface upon which the foamed liquid is to be sprayed.

Still another important object of this invention is to provide an apparatus for foaming and spraying a foamable liquid and which may be operated by personnel having only minimal instruction.

A final object of this invention to be specifically enumerated herein is to provide a foam generator in accordance with the preceding objects and which will conform to conventional forms of manufacture be of simple construction and easy to use so as to provide a device that will be economically feasible, long lasting trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
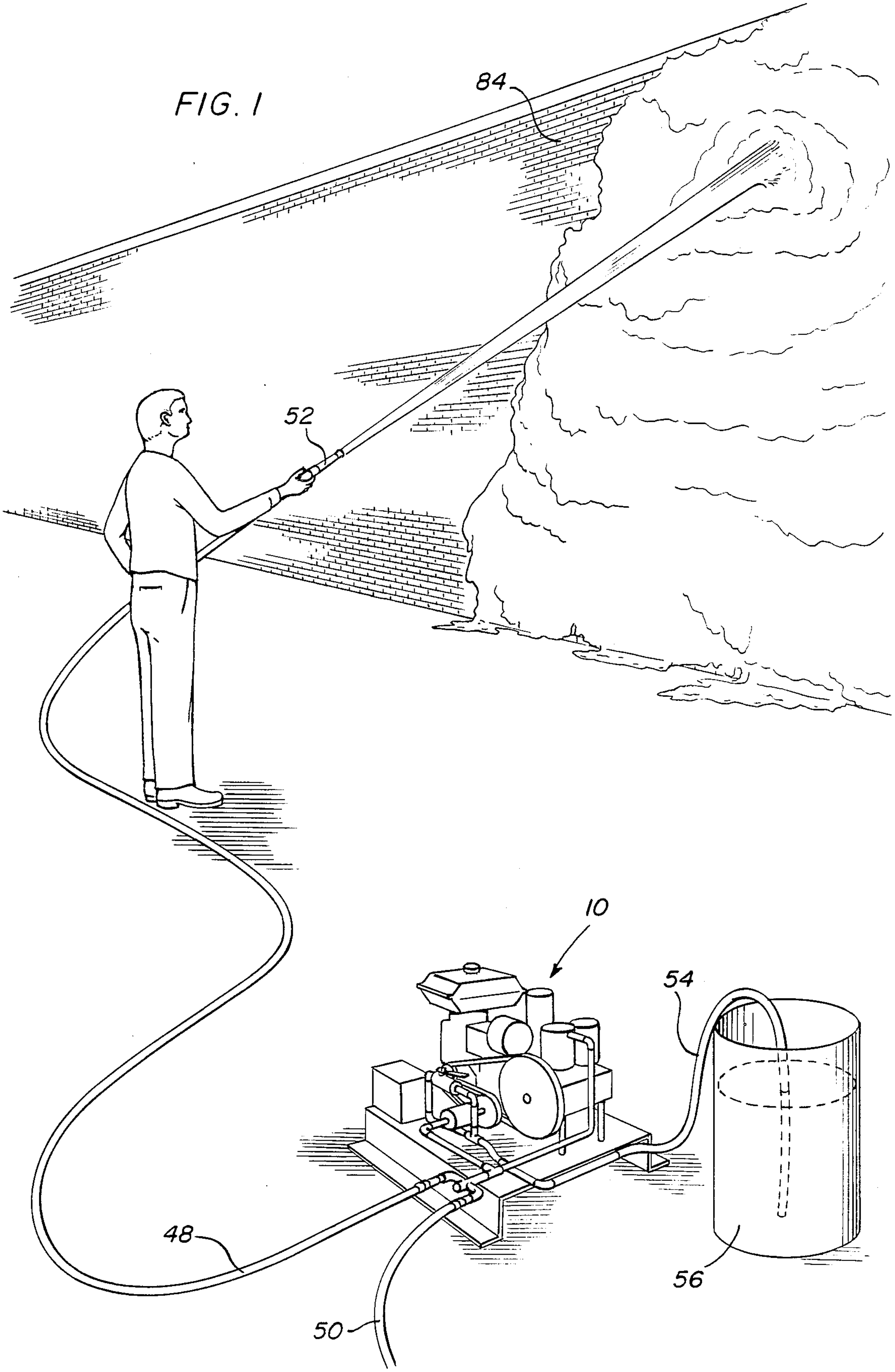
FIG. 1 is a perspective view of the foam generator in use supplying a pressurized foamed liquid to a discharge nozzle from which the foamed liquid is being sprayed onto a vertical surface.

Referring now more specifically to the drawings, the numeral 10 generally designates the foam generator of the instant invention.

The generator 10 includes a mounting base 12 which is portable in nature and upon which an internal combustion engine 14 is mounted. The engine 14 is of the electric starting type and the base 12 further mounts a battery 16 for driving the starter motor (not shown) of the engine 14.

Figure 3:
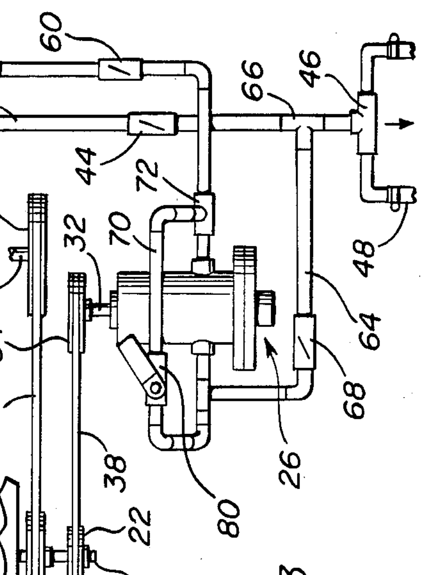
FIG. 3 is a fragmentary schematic plan view of the fluid handling system of the instant invention.

The engine 14 includes a rotary power output shaft 18 upon which large and small diameter pulleys 20 and 22, see FIG. 3, are mounted and the base 12 further mounts an air compressor referred to in general by the reference numeral 24 and a flex gear fluid pump referred to in general by the reference numeral 26. The air compressor 24 includes a rotary input shaft 28 upon which a pulley 30 is mounted aligned with the pulley 20 and the pump 26 includes a rotary input shaft 32 upon which a pulley 34 is mounted aligned with the pulley 22. Flexible belts 36 and 38 drivingly connect the pulley 20 to the pulley 30 and the pulley 22 to the pulley 34.

The compressor 24 includes a compressed air outlet 40 to which one end of a compressed air line 42 is connected. The air line 42 includes a check valve 44 serially connected therein and the discharge end of the air line 42 opens into a discharge manifold 46 from which a pair of discharge hoses 48 and 50 extend, the outlet ends of the hoses 48 and 50 having discharge nozzles 52 thereon.

A suction line 54 has its inlet end communicated with a source 56 of a foamable liquid and its outlet end connected to the inlet 58 of the pump 26. The line 54 includes a check valve 60 serially connected therein as well as an in-line "Y" strainer 62 connected therein downstream from the check valve 60.

A liquid discharge line 64 includes an inlet end connected to the outlet of the pump 26 and an outlet end opening into the air line 42 through a tee fitting 66, the liquid discharge line 64 including a check valve 68 serially connected therein. In addition, a by-pass line 70 is connected at its inlet end to the suction line 54 immediately upstream from the pump inlet 58 by a tee fitting 72 and the outlet end of the by-pass line 70 is connected to the discharge line 64 by a tee fitting 74 immediately downstream from the pump outlet and upstream from the check valve 68.

Figure 2:
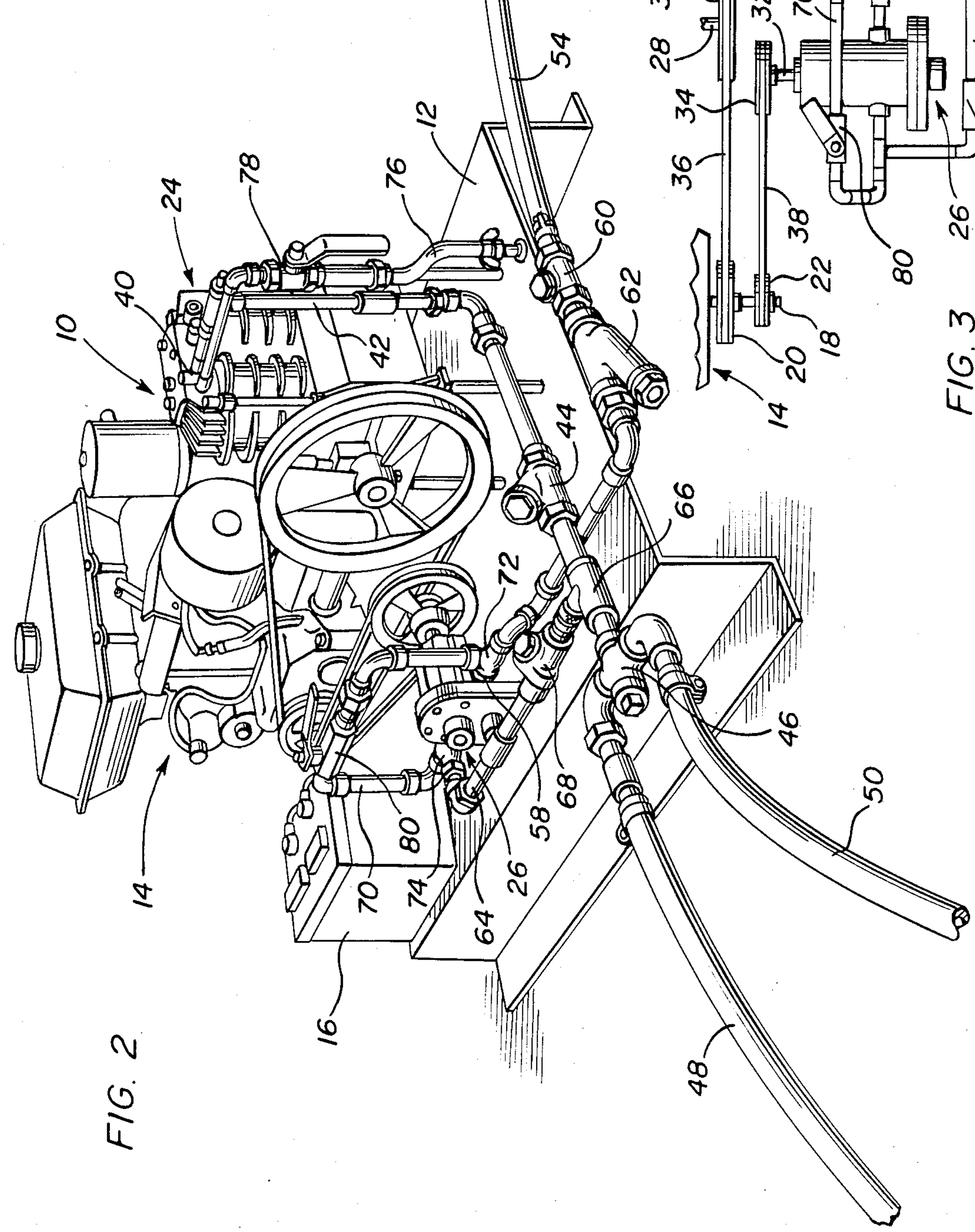
FIG. 2 is a perspective view of the foam generator.

It is will be noted from FIG. 2 of the drawings that a moisture discharge line 76 also has its inlet end connected to the outlet of the compressor 24 and that the moisture discharge line 76 has a ball valve 78 connected therein, the outlet end of the line 76 opening downwardly through the base 12. Accordingly, the ball valve 78 may be intermittently opened in order to drain condensate from the pressure side of the compressor 24. Further, a similar but dual function control valve 80 is serially connected in the by-pass line 70.

The foam generator 10 has been specifically designed to foam and spray apply various foamable liquids. In many different environments including poultry hatching areas, poultry grow out areas, poultry breeding areas, meat packing plants, hospitals and other area in which cleanliness and asepsis is required thorough cleaning and disinfecting procedures must be carried out, at least occasionally. Further, the most convenient manner of thorough cleaning and disinfecting is through the utilization of cleaning and/or disinfecting fluids which may be applied in various manners to surfaces to be cleaned and/or disinfected. However, the application of cleaning and/or disinfecting fluids to surfaces by conventional methods is messy, time-consuming and in most cases objectionable for various reasons if the liquid is hand applied. Accordingly, it has been deemed advantageous to apply such liquids to various surfaces by spray action in a manner such that the user of the sprayer does not come into direct contact with the liquid being sprayed. However, the application of cleaning and/or disinfecting liquids on downwardly facing surfaces as well as vertical or inclined surfaces does not offer sufficient liquid to surface contact time to effect the desired cleaning or disinfecting action, inasmuch as liquids rapdily fall from or run down such downwardly facing, vertical and inclined surfaces.

The foam generator 10 of the instant invention utilizes a cleaning and/or disinfecting liquid of the foamable type such as "Tek-Trol" or "Tek-281" manufactured by Bio-Tek Industries, Inc. of Atlanta, Ga. These liquids, when mixed with high pressure air, are foamable and therefore remain upon downwardly facing, vertical and inclined surfaces for extended periods of time sufficient to provide the desired liquid to surface contact time in order to effect the requisite cleaning and/or disinfecting action of these surfaces.

Upon initial operation of the engine 14, the valve 80 is closed in order to enable the pump 26 to develop maximum vacuum within the suction line 54. This maximum vacuum is sufficient to draw the liquid from the source 56 through the line 54 to the pump 26. Then, as the suction line 54 and pump 26 become fully primed, the valve 80 is partially opened in order to allow some of the liquid discharge from the pump 26 to flow through the by-pass line 70 back to the intake 58 of the pump 26. This, of course, reduces the pressure of the pumped liquid passing through the discharge line 64 and through the check valve 68 to the tee fitting 66. The liquid entering the air line 42 at the tee fitting 66 is mixed with the air under pressure being discharged from the compressor 24 through the air line 42 and is thereby foamed and subsequently passes through the manifold 46 and the hoses 48 and 50 for discharge from the nozzles 52. The "wetness" of the foamed liquid being applied to the vertical surface 84 in FIG. 1 may be controlled by varying the amount the valve 80 is opened. When the valve 80 is further opened, the pressure and volume of liquid discharged from the pump 26 and admitted into the air line 42 is reduced. Therefore, the foamed liquid applied to the surface 84 may be reduced in "wetness" or "dried-out". This results in a foam which is lighter in weight and which will therefore remain upon the vertical surface 84 for an extended period of time. However, it is not always necessary to provide extended liquid to surface contact time and in these instances a wetter foam may be applied by more fully closing the valve 80.

It will be noted that once the operating speed of the engine 10 is achieved, the discharge of air under pressure from the compressor 24 remains substantially constant, and that the "wetness" of the foam being discharged from the nozzles 52 is controlled merely by control of the valve 80.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A portable foam generator including a mounting base, a rotary input air compressor and a rotary input liquid pump supported from said base, motor means mounted to said base and including rotary power output means drivingly connected to said compressor and said liquid pump, said air compressor including a compressed air outlet and said liquid pump including a liquid inlet and a pressurized liquid outlet, a liquid suction line having a first end connected to said liquid inlet and a second end for communication with a source of liquid foamable by the admixing of air under pressure therewith, a compressed air line having a first end connected to said air outlet and a second end including a discharge nozzle, a liquid discharge line having a first end connected to said liquid outlet and a second end opening into said compressed air line, and a by-pass and liquid dry-out line having a first end connected to said liquid suction line and and a second end connected to said liquid discharge line and including a variable flow control valve serially connected therein.

2. The foam generator of claim 1 including a check valve serially connected in said liquid discharge line intermediate the second end of said by-pass line and the second end of said liquid discharge line.

3. The foam generator of claim 1 including a valve moisture discharge line having a first end connected to said compressed air outlet and a second end from which accumulated moisture may be discharged.

4. The foam generator of claim 1 wherein said motor means comprises a reciprocating piston internal combustion engine.

5. The foam generator of claim 1 including a check valve serially connected in said liquid suction line upstream from the first end of said by-pass line.

6. The foam generator of claim 5 including filter means serially connected in said liquid suction line intermediate said check valve and the first end of said bypass line.

7. The foam generator of claim 5 including filter means serially connected in said liquid suction line intermediate said check valve and the first end of said bypass line, a check valve serially connected in said liquid discharge line intermediate the second end of said bypass line and the second end of said liquid discharge line.

8. The foam generator of claim 1 wherein said liquid pump comprises a flex gear pump.

9. The foam generator of claim 8 including a valve moisture discharge line having a first end connected to said compressed outlet and a second end from which accumulated moisture may be discharged.

* * * * *